United States Patent [19]

Itoh et al.

[11] Patent Number: 4,687,956
[45] Date of Patent: Aug. 18, 1987

[54] LIQUID CRYSTAL ELEMENT DRIVING APPARATUS

[75] Inventors: Hiroshi Itoh; Yasutoshi Suzuki, both of Oobu; Tsuyoshi Fukada, Nagoya; Shinya Ohmi, Anjo; Kunihiko Hara, Nukata, all of Japan

[73] Assignee: Nippondenso Co., Ltd., Kariya, Japan

[21] Appl. No.: 670,015

[22] Filed: Nov. 9, 1984

[30] Foreign Application Priority Data

Nov. 14, 1983 [JP] Japan .................. 58-213624

[51] Int. Cl.⁴ .............. G02F 1/13; G09G 3/36; G09G 3/18; H03K 3/26
[52] U.S. Cl. .................. 307/310; 307/311; 350/332; 340/784
[58] Field of Search .............. 307/310, 311, 270; 350/278, 331 T, 332; 340/812, 765, 705, 784

[56] References Cited

U.S. PATENT DOCUMENTS

| | | | |
|---|---|---|---|
| 3,862,798 | 1/1975 | Hopkins | 350/278 |
| 4,161,653 | 7/1979 | Bedini et al. | 350/278 |
| 4,390,874 | 6/1984 | Woodside et al. | 350/331 T |

FOREIGN PATENT DOCUMENTS

| | | |
|---|---|---|
| 48-35384 | 10/1973 | Japan . |
| 50-93160 | 7/1975 | Japan . |
| 50-106597 | 8/1975 | Japan . |
| 51-43095 | 4/1976 | Japan . |

*Primary Examiner*—Stanley D. Miller
*Assistant Examiner*—B. P. Davis
*Attorney, Agent, or Firm*—Cushman, Darby & Cushman

[57] ABSTRACT

An apparatus for driving a liquid crystal element by an increased voltage and at a lowered frequency in conformity with temperature fall in the liquid crystal element so as to achieve complete driving of the element even in a low temperature range. In order to increase the driving voltage, the apparatus comprises a booster circuit for increasing a battery voltage, and a voltage divider circuit including an element-temperature sensor as a component thereof and serving to produce a control voltage by dividing the output voltage of the booster circuit. In such configuration, the booster circuit performs its operation in such a manner as to maintain constant the control voltage obtained from the voltage divider circuit.

12 Claims, 19 Drawing Figures

LIQUID CRYSTAL ELEMENT DRIVING APPARATUS

RELATED APPLICATIONS

The subject matter of this application is related in general to the subject matter of the following applications: Itoh et al, Ser. No. 6l6,185, filed June 1, 1984, Ito et al, Ser. No. 593,946, filed Mar. 27, 1984, Ohmi et al, Ser. No. 671,612, filed Nov. 15, 1984, and Itoh et al, Ser. No. 701,224 entitled "DRIVING APPARATUS FOR DAZZLE-FREE REFLECTION MIRRORS OF A VEHICLE", filed Feb. 13, 1985. These cases all related in generaly to dazzle-free mirrors.

BACKGROUND OF THE INVENTION

The present invention relates to an apparatus designed to drive a liquid crystal element in an attempt to extend the operating temperature range of the element, particularly its low temperature region.

The apparatus of the present invention is adapted for driving a liquid crystal element operated within a wide temperature range as in an automotive glare prevention type reflex mirror or the like employing a DSM (dynamic scattering mode) liquid crystal.

The DSM liquid crystal element used heretofore generally has specific characteristics that its threshold voltage to generate a dynamic scattering mode varies depending on a temperature in such a manner as to become higher with temperature fall. Therefore, when the driving voltage is established at a low level for reducing power consumption of the liquid crystal element, its operating temperature range is rendered so narrow that a proper operation is impossible in a low temperature region. To the contrary, if the driving voltage is established at a higher level to widen the temperature range, the power consumption is increased with another disadvantage that an excess voltage far higher than the threshold voltage is applied under normal temperature condition, whereby the service life of the element is shortened.

For the purpose of eliminating the problems mentioned above, some improvements have already been contrived as disclosed in, for example, Japanese Patent Laid-open No. 50-93160 wherein a driving voltage for a liquid crystal element is increased with fall of the element temperature.

However, since the above apparatus is so formed that a relatively high input voltage is once decreased, prior to application to a liquid crystal element, in accordance with the resistance of a thermistor provided to sense the temperature of the element, there exist disadvantages that a considerably great voltage loss is unavoidable and, in case any variation occurs in the input voltage, the voltage applied to the liquid crystal element also varies to eventually fail in performing stable driving of the element.

Figure 1:
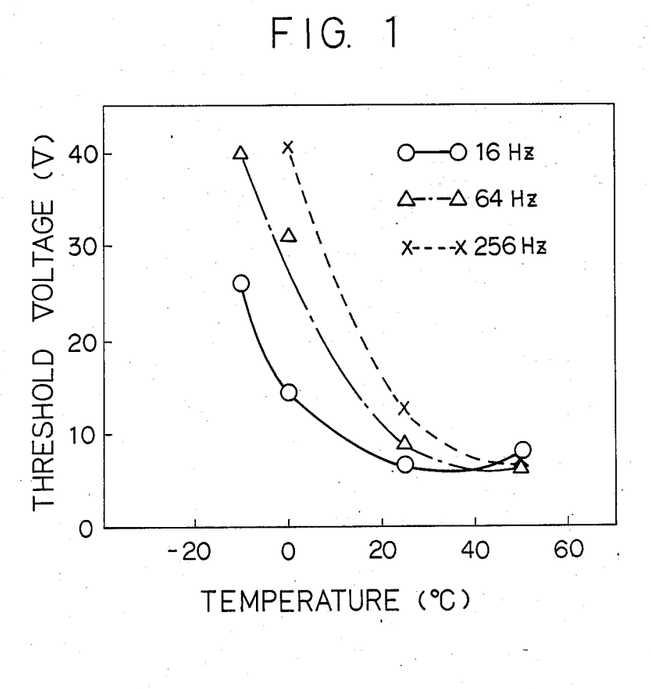
FIG. 1 graphically shows the result of measuring the temperature characteristic of a DSM liquid crystal element with respect to the threshold voltage thereof with its frequency used as a parameter.

As a result of the experiment conducted by the present inventors, it has been found that the temperature characteristic of the DSM liquid crystal element with respect to the threshold voltage thereof is such as graphically shown in FIG. 1 with the frequency used as a parameter. The DSM liquid crystal element employed in the experiment was composed of nematic liquid crystal DNM-4 (made by Dai Nippon Paint Co., Ltd.), and its substrate was processed with parallel orientation at an interval of 10 microns. When the element is driven by a voltage of a fixed frequency, as will be understood from the graphic representation, its threshold voltage increases in accordance with temperature fall. The graph further shows that the trend of increase of the threshold voltage induced with temperature fall appears to be more conspicuous with rise of the driving frequency and also that, in case the temperature is maintained constant, the threshold voltage becomes higher as the driving frequency rises.

SUMMARY OF THE INVENTION

In view of the circumstances mentioned above, the primary object of the present invention resides in providing an improved apparatus which is so designed as to increase a driving voltage for a liquid crystal element in accordance with fall of the element temperature while minimizing a voltage loss during generation of the driving voltage and is still capable of ensuring stable driving of the element despite any variation occurring in a battery voltage applied as a driving input.

For achieving the above object, a booster circuit is employed in the present invention to increase the battery voltage. The booster circuit is of a feedback control type which receives an input control voltage obtained through division of the aforesaid output voltage and executes boosting to maintain the control voltage constant. And a voltage divider circuit for dividing the output voltage is composed of a thermistor as a component to sense the temperature of the liquid crystal element, so as to increase the output voltage in conformity with fall of the element temperature.

Another object of the invention is to provide a liquid crystal element driving apparatus capable of further decreasing the driving voltage in a low temperature region.

In order to accomplish this object, the circuit configuration is so contrived that the frequency of the element driving voltage is lowered sequentially with temperature fall.

DESCRIPTION OF THE PREFERRED EMBODIMENTS

Hereinafter the present invention will be described in detail with reference to an exemplary embodiment thereof.

This embodiment is designed to function as a driving apparatus for a glare prevention type reflex mirror equipped with a DSM liquid crystal element on its front. In such reflex mirror, a glare preventive operation is performed by applying a voltage to the liquid crystal element to generate a dynamic scattering mode therein and scattering the light with a liquid crystal layer to reduce the reflectivity of the mirror. Desired prevention of glare is achieved by the application of a voltage to the DSM liquid crystal when the intensity of the light sensed by a photoelectric transducer element has exceeded a predetermined level. A variety of inventions have already been developed with regard to the fundamental structure of such glare preventive reflex mirror as disclosed in, for example, Japanese Patent Publication No. 48-35384.

Figure 2:
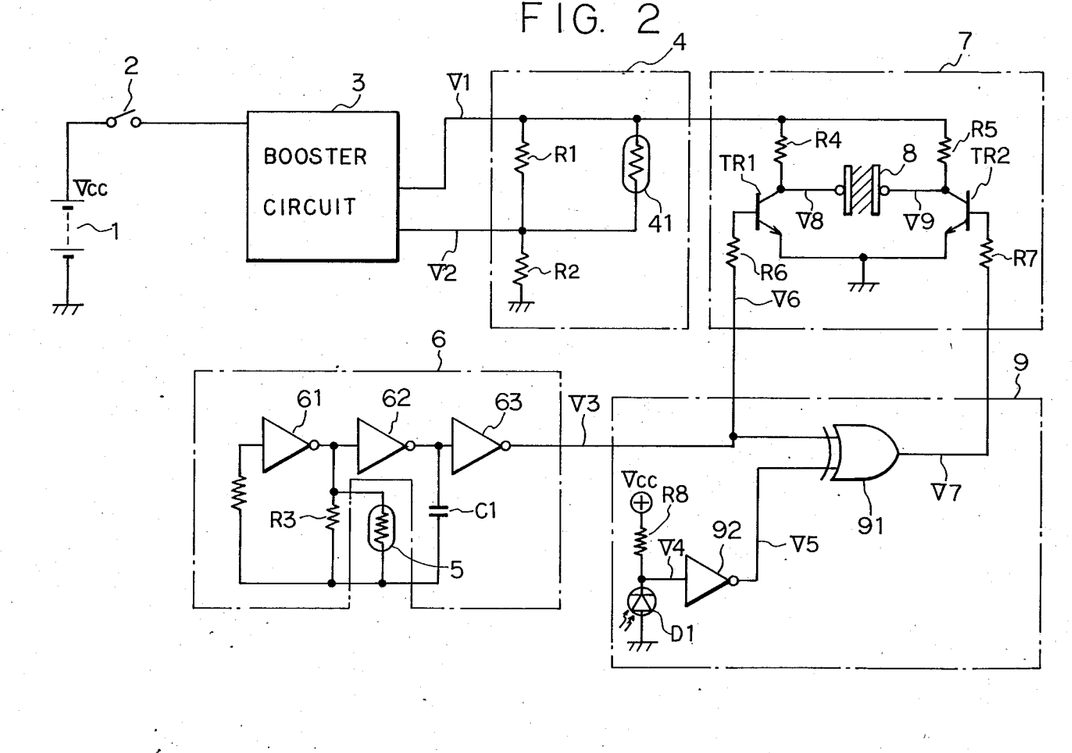
FIG. 2 is an electric circuit diagram of a liquid crystal element driving apparatus embodying the present invention.

In the electric circuit diagram of FIG. 2 for driving a liquid crystal element, there are shown an automotive battery 1 and a light switch 2. Merely when the light switch 2 is turned on or during nighttime running of an automobile, a voltage is applied to each circuit in the apparatus to perform the above-described glare preventive operation. A booster circuit 3 serves to increase an input voltage from the automobile battery 1 up to a level required for driving a liquid crystal element 8. A voltage divider 4 includes a thermistor 41 to sense the temperature of the liquid crystal element 8 and functions to divide the output voltage V1 of the booster circuit 3 in cooperation with resistors R1 and R2, thereby producing a control voltage V2 which is outputted to the booster circuit 3. The thermistor 41 is attached to a glare preventive reflex mirror so as to sense the temperature of the liquid crystal element 8. The resistance of the thermistor 41 has a negative temperature coefficient. Therefore, when temperature fall is sensed by the thermistor 41, its resistance increases to eventually lower the control voltage V2.

Figure 3:
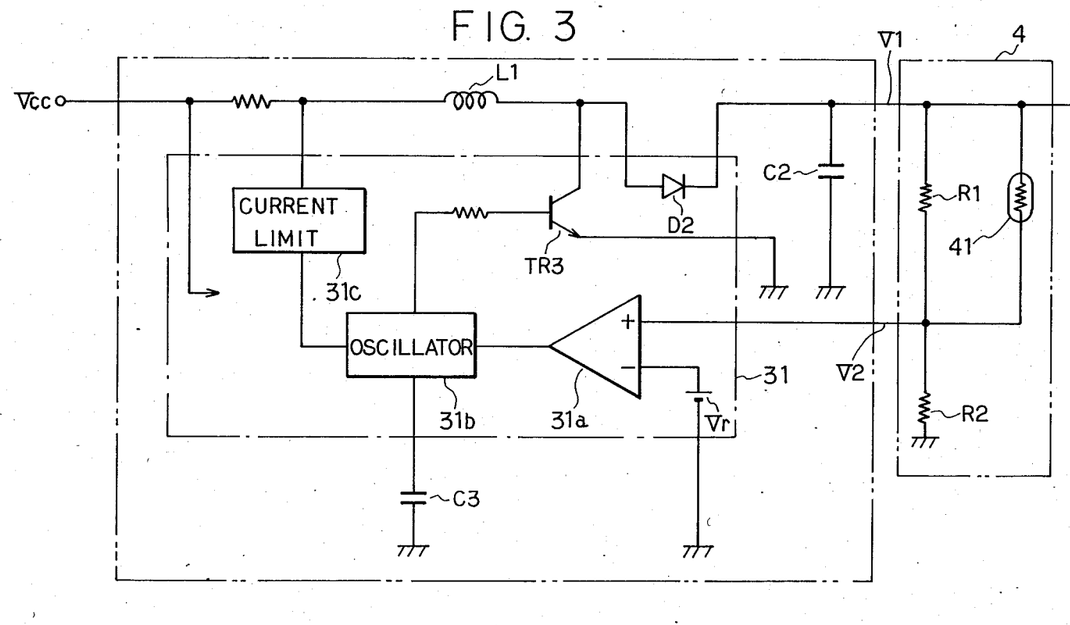
FIG. 3 is a detailed electric circuit diagram of a booster circuit and a voltage divider circuit employed in the apparatus of FIG. 2.
Figure 4:
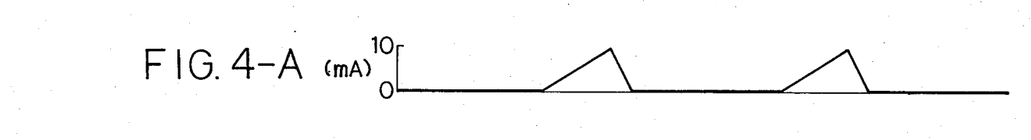
FIGS 4A-F show waveforms of signals produced in the electric circuit configuration of FIG. 2.

FIG. 3 shows detailed configurations of such booster circuit 3 and voltage divider circuit 4. In this embodiment, the booster circuit 3 comprises a switching regulator 31 (integrated circuit TL479CN made by Texas Instruments Inc.), which is actuated by the voltage received from the automotive battery 1 via the light switch 2. The booster circuit 3 performs its operation by utilizing an electromotive force generated when interrupting the current that flows in a coil L1. FIG. 4 shows the waveforms of signals produced in the individual components of the electric circuits. When a transistor TR3 is turned on in the switching regulator 31, the current flowing in the coil L1 is gradually increased as shown in FIG. 4-A. And upon turn-off of the transistor TR3 after the lapse of a predetermined time (e.g. 10 microseconds), the current flowing in the coil L1 is reduced and consequently an electromotive force is generated in proportion to the current reduction rate and the inductance of the coil L1, so that the collector voltage of the transistor TR3 becomes such as shown in FIG. 4-B. The electromotive force thus generated serves to charge a capacitor C2 via a diode D2. The voltage retained in the capacitor C2 is released therefrom as a output voltage V1 (shown in FIG. 4-C), which is than divided by a voltage divider circuit 4 consisting of resistors R1, R2 and a thermistor 41. And the divided voltage is outputted as a control voltage V2 (shown in FIG. 4-B) to the switching regulator 31. A comparator 31a compares the control voltage V2 with a reference voltage Vr and, in case the former is lower than the latter, its output (shown in FIG. 4-E) is inverted to a low level. Subsequently, in response to the low-level output voltage thus obtained, an oscillator circuit produces a pulse output (shown in FIG. 4-F) of a fixed duration determined by the capacitor C3. The transistor TR3 is turned on by this pulse output to perform its aforesaid boosting action. That is, when the control voltage V2 becomes lower than the reference voltage Vr, the booster circuit 3 functions to increase the control voltage V2 beyond the reference voltage Vr, thereby changing the output voltage V1 to the vicinity of the reference voltage Vr. Meanwhile, if the temperature of the liquid crystal element 8 falls, the resistance of the thermistor 41 increases to reduce the control voltage V2 as a result, so that the booster circuit 3 functions to raise the output voltage V1 for increasing the control voltage V2. Thus, the output voltage V2 is increased with temperature fall of the liquid crystal element 8 or is reduced with temperature rise thereof.

In the switching regulator 31, a current limiter 31c is provided for protection of the circuit from any abnormal current.

Figure 5:
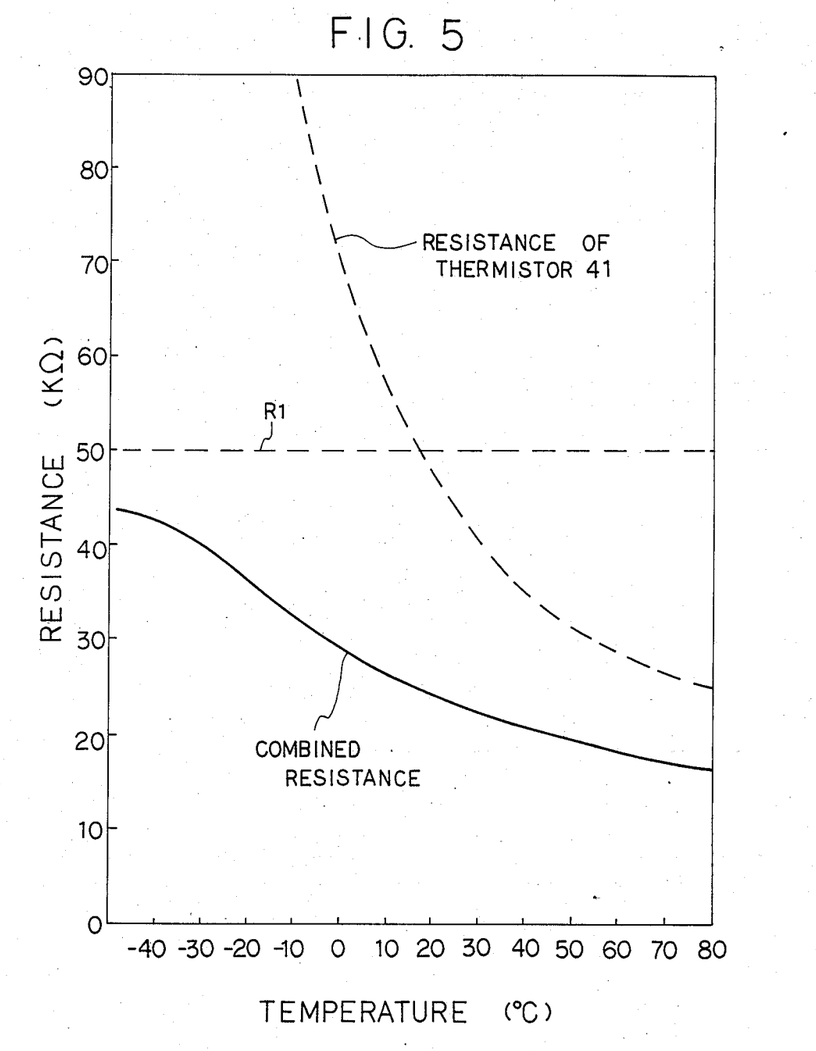
FIG. 5 graphically shows variations induced in the resistance value of the voltage divider circuit relative to the temperature of the liquid crystal element.

FIG. 5 graphically shows the resistance characteristic of the thermistor 41 relative to temperature and also the combined resistance characteristic of the thermistor 41 and the resistor R1 relative to temperature. The combined resistance value corresponds to the output voltage V1 and increases nonlinearly in accordance with temperature fall. As will be understood from this graphic representation, the combined resistance is limited to a fixed value by the action of the resistor R1, thereby preventing any abnormally high resistance value that may otherwise be caused due to the sole existence of the thermistor 41.

In FIG. 2, an oscillator circuit 6 produces an oscillation output V3 for applying an AC voltage to the liquid crystal element 8. The oscillator circuit 6 employed in this embodiment is of a pulse oscillation type which consists of inverters 61, 62 and 63 composed of C-MOS elements. The oscillation frequency of this circuit is determined by a time constant depending on the values of the resistor R3 and the capacitor C1. Meanwhile, a thermistor 5 is connected in parallel with two ends of the resistor R3 and functions as a sensor to detect the temperature of the liquid crystal element 8 as the aforesaid thermistor 41. Upon occurrence of temperature fall in the element 8, the combined resistance of the thermistor 5 and the resistor R3 increases to consequently lower the oscillation frequency of the oscillator circuit 6. In this manner, the oscillation frequency can be lowered in accordance with temperature fall.

A driving circuit 7 modulates the output voltage V1 of the booster circuit 3 with the frequency of an oscillation voltage V3 obtained from the oscillator circuit 6 and drives the liquid crystal element 8 by such modulated voltage. The driving circuit 7 consists of transistors TR1, TR2 and resistors R4, R5, R6 and R7. The output voltage V1 of the booster circuit 3 is applied via resistors R4 and R5 respectively to the collectors of transistors TR1 and TR2. Meanwhile, the output voltage V3 of the oscillator circuit 6 is applied via a resistor R6 to the base of transistor TR1, and the output voltage V7 of an exclusive OR circuit 91 is applied via a resistor R7 to the base of transistor TR2.

A glare preventive detector circuit 9 for sensing the intensity of the light incident upon the reflex mirror and producing an output signal to execute a glare preventive action in response to any light intensity above a predetermined level consists of a photodiode D1 for sensing the light intensity, an inverter 92 for inverting a signal representative of the output voltage V4 of the photodiode D1, and an exclusive OR circuit 91.

When the intensity of the light incident upon the reflex mirror has a small value, the input voltage to the inverter 92 is at a high level while the output voltage V5 thereof is at a low level. Consequently, the output voltage V7 of the exclusive OR circuit 91 has an in-phase relationship to the oscillation voltage V3 applied to its other terminal. As a result, the base voltages V6 and V7 of transistors TR1 and TR2 have an in-phase relationship to each other. It follows that voltages V8 and V9 applied to two terminals of the liquid crystal element 8 become mutually in-phase AC voltages of a rectangular waveform, whereby the potential difference between the two terminals of a liquid crystal layer in the element 8 is reduced to zero. Consequently, no dynamic scattering is induced in the liquid crystal, so that any glare prevention is not executed at all.

In the meanwhile, when the intensity of the light incident upon the reflex mirror has a great value, the voltage V4 is inverted to a low level and thereby turns the voltage V5 to a high level, so that the voltage V7 comes to have an opposite-phase relationship to the output voltage V3 of the oscillator circuit 6. Therefore the base voltages V6 and V7 of transistors TR1 and TR2 are placed in an opposite-phase relationship to each other. As a result, the voltages V8 and V9 applied to the two terminals of the liquid crystal element 10 come to have mutually opposite phases, whereby an AC voltage is applied to the liquid crystal layer in the element 8. The amplitude of this AC voltage is equal to the output voltage V1 of the booster circuit 3. In this manner, the liquid crystal element 8 receives the rectangular-wave AC voltage which is equal in frequency to the oscillation voltage V3 of the oscillator circuit 6 and is also equal in amplitude to the output voltage V1 of the booster circuit 3. Consequently, a dynamic scattering mode is generated in the liquid crystal element 8 to exert a glare preventive effect on the reflex mirror due to such dynamic scattering induced in the liquid crystal layer.

Figure 6:
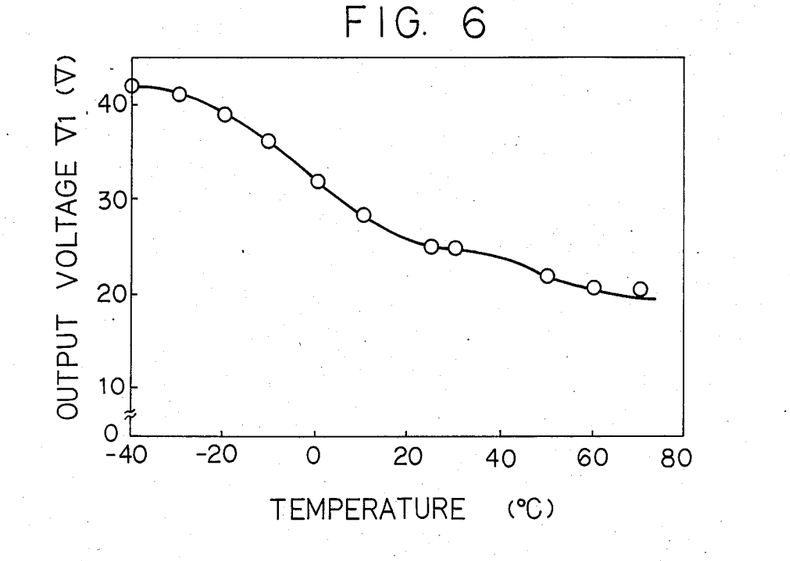
FIG. 6 graphically shows the output voltage characteristic of the booster circuit relative to the temperature of the liquid crystal element.

FIG. 6 graphically shows the result of measuring the temperature characteristic of the booster circuit 3 with respect to its output voltage V1 in the above embodiment, wherein the voltage V1 increases in accordance with temperature fall. In this exemplary embodiment, the liquid crystal element is driven by the output of 25 volts at 25° C., and the driving voltage is increased to about 40 volts at −30° C.

Figure 7:
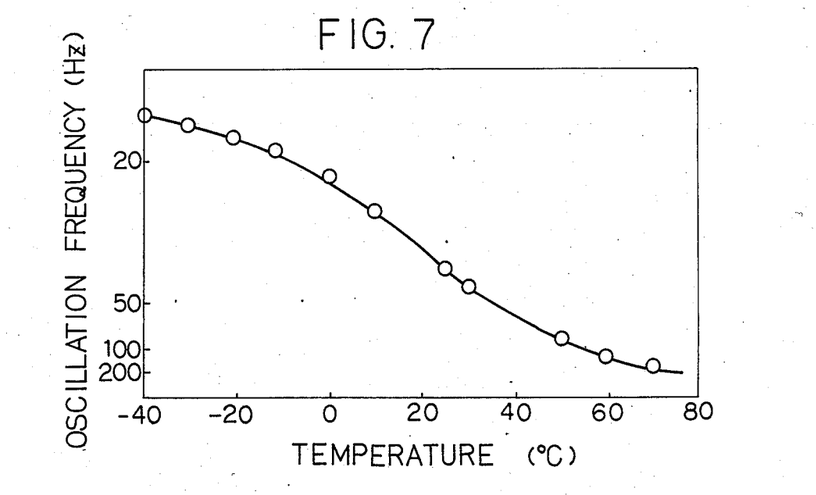
FIG. 7 graphically shows the oscillation frequency characteristic of an oscillator circuit relative to the temperature of the liquid crystal element.

FIG. 7 graphically shows the result of measuring the temperature characteristic of the oscillator circuit 6 with respect to the frequency of its oscillation voltage V3 in the above embodiment, wherein the oscillation frequency is lowered with temperature fall. In this exemplary embodiment, the liquid crystal element is driven by the output of 37 Hz at 25° C., and the driving frequency is lowered to 17 Hz at −30° C.

Thus, by boosting the driving voltage and lowering the frequency thereof in accordance with temperature fall in the liquid crystal element 8, it becomes possible to extend the operating temperature range and particularly the low temperature region without the necessity of increasing the driving voltage to an extremely high level.

Figure 8:
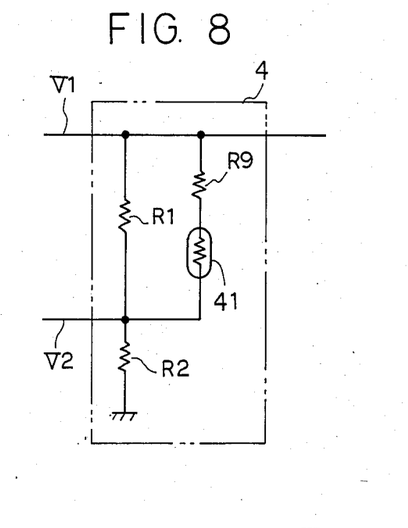
FIGS. 8, 10 and 14 are electric circuit diagrams of other exemplary voltage divider circuits.
Figure 9:
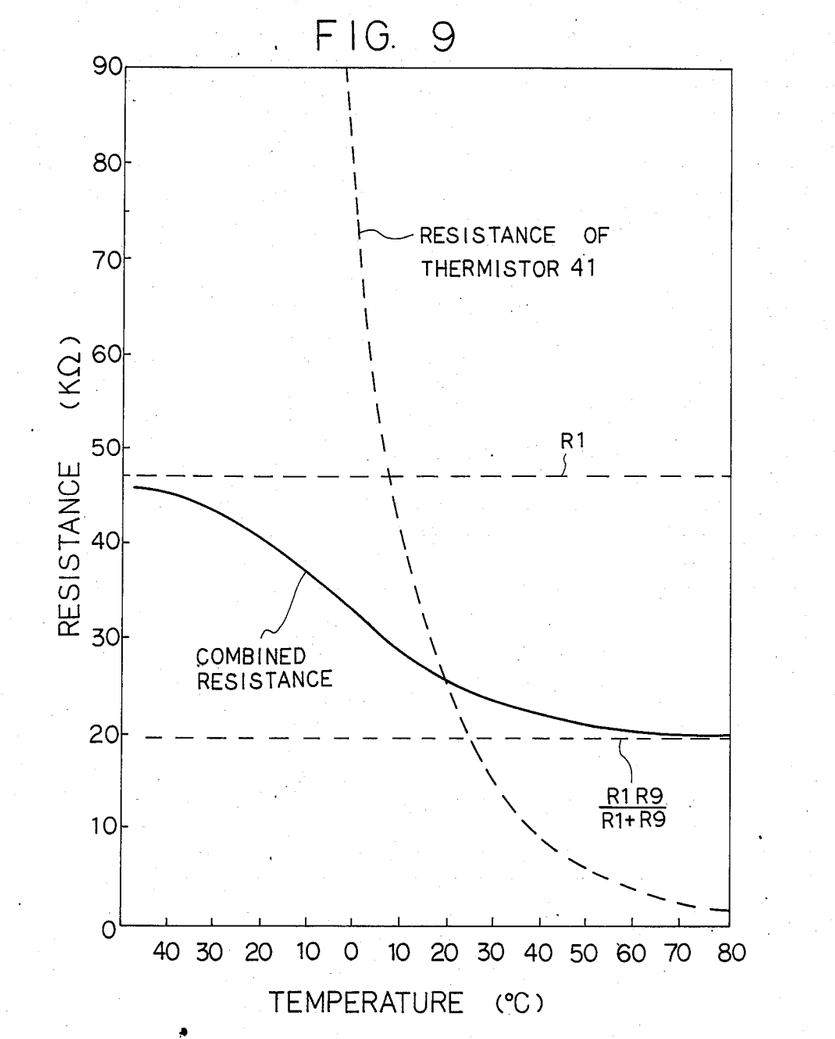
FIG. 9 graphically shows variations induced in the resistance value of the voltage divider circuit of FIG. 8 relative to the temperature of the liquid crystal element.

In the voltage divider circuit 4, a resistor R9 may be connected in series with the thermistor 41 as illustrated in FIG. 8. In this arrangement, even with employment of such a thermister 41 that its resistance varies as shown in FIG. 9, the combined resistance value of the resistors R1, R9 and the thermistor 41 can be set at the lower limit thereof as R1 R9/R1+R9 and is therefore settable also at the lower limit relative to the output voltage of the booster circuit 3.

Figure 10:
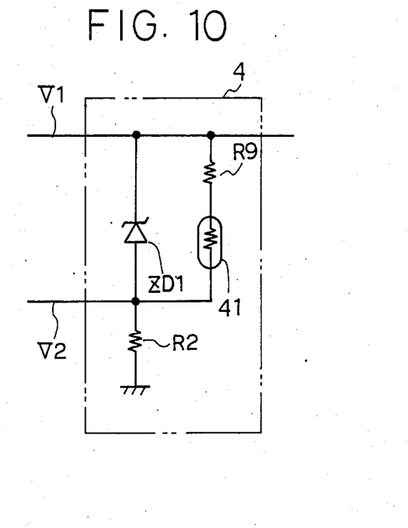
Figure 11:
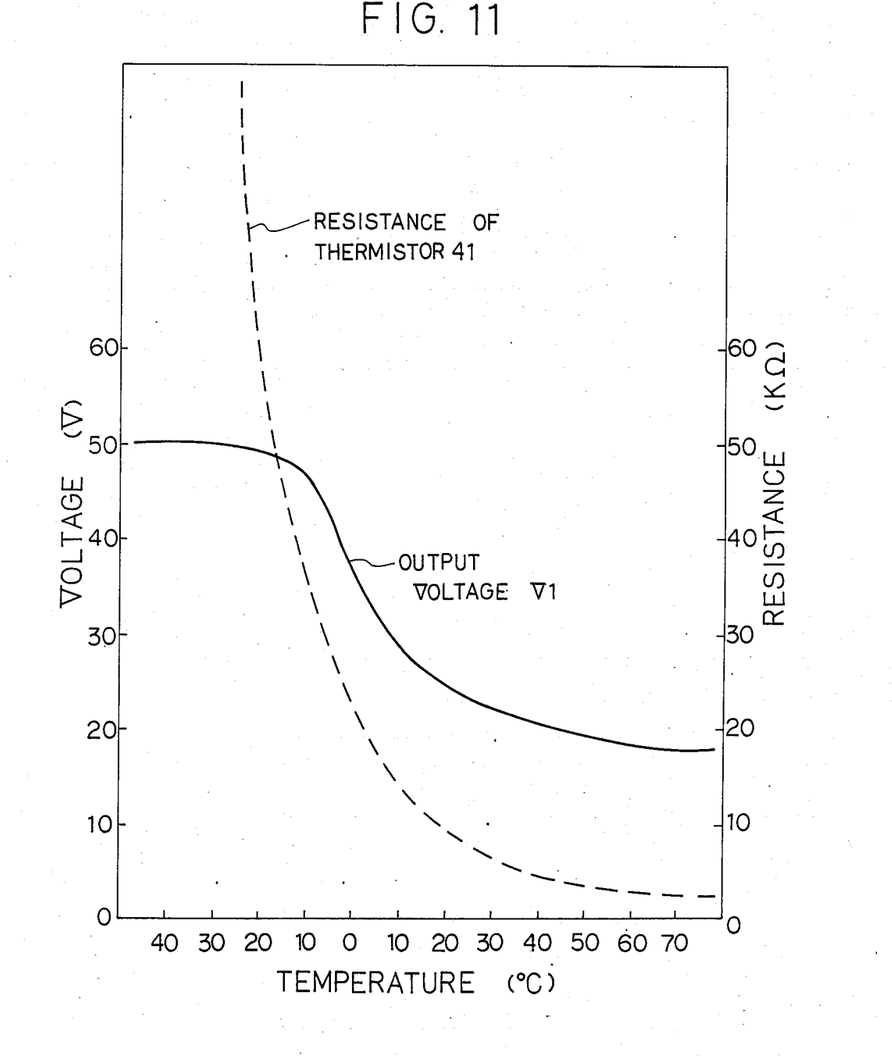
FIG. 11 graphically shows the output voltage characteristic of the voltage divider circuit of FIG. 9 relative to the temperature of the liquid crystal element.

The resistor R1 in the voltage divider circuit 4 of FIG. 8 may be replaced with a Zener diode ZD1 as shown in FIG. 10. In an example where the Zener diode ZD1 employed has a Zener voltage of 50 volts, the diode ZD1 is substantially in an open state when the output voltage V1 is lower than 50 volts. However, if the output voltage V1 exceeds 50 volts, a current comes to flow suddenly to maintain the voltage V1 under 50 volts, thereby ensuring a remarkably sharp voltage characteristic with respect to the temperature of the liquid crystal element 8. FIG. 11 graphically shows the temperature characteristic of such voltage divider circuit relative to the output voltage V1 obtained therefrom, wherein a dotted line represents the temperature characteristic of the thermistor 41.

Figure 12:
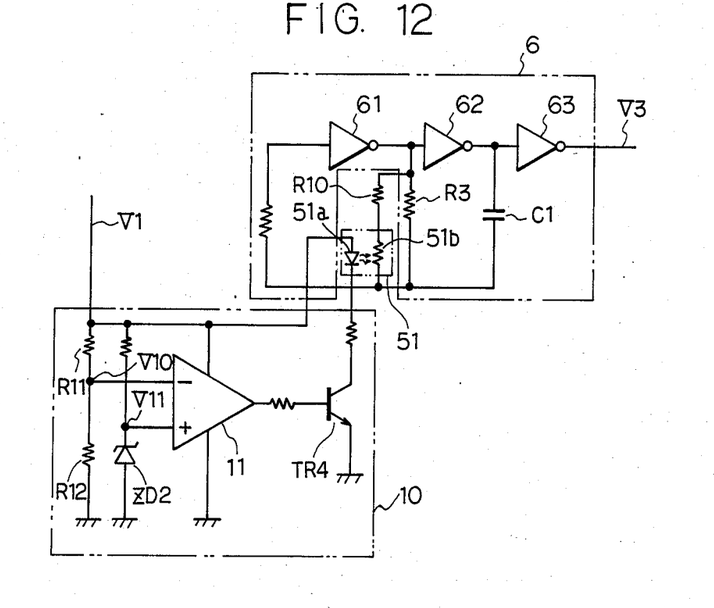
FIG. 12 is an electric circuit diagram of principal components in an arrangement employing merely a single thermistor to sense the temperature of the liquid crystal element.

In order to change both the amplitude and the frequency of the voltage for driving the liquid crystal element 8, two thermistors are provided in the aforesaid exemplary circuit so as to sense the temperature of the element 8. However, a single thermistor is capable of combining the two functions. FIG. 12 is an electric circuit diagram of principal components in such arrangement, wherein a resistor R10 and a photocoupler 51 are provided to change the oscillation frequency of the oscillator circuit 6, and a discriminator circuit 10 is provided for controlling light emission of an LED 51a in the photocoupler 51. The discriminator circuit 10 evaluates the output voltage V1 of the booster circuit 3 and controls light emission of the LED 51a in accordance with the result of such evaluation. In this operation, first the output voltage V1 of the booster circuit 3 is divided through resistors R11 and R12 to produce a fractional voltage V10, which is subsequently compared with the voltage V11 of a Zener diode ZD2 by a comparator 11. When the fractional voltage V10 raised due to an increase of the output voltage V1 has exceeded the voltage V11 of the Zener diode ZD2, the output of the comparator 11 is turned to a low level to switch off the transistor TR4. Then no current comes to flow in the LED 51a of the photocoupler 51, so that the LED 51a is rendered dark to increase the resistance of a photoconductive element 51b. Consequently, the combined resistance of the photoconductive element 51b and the resistor R3 becomes greater to lower the oscillation frequency of the oscillator circuit 6 as a result.

Figure 13:
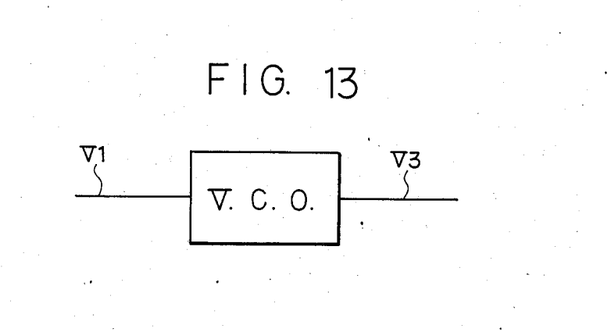
FIG. 13 is an electric circuit diagram of another exemplary oscillator circuit.

As illustrated in FIG. 13, the oscillator circuit 6 may be constituted of a voltage controlled oscillator (V.C.O.) whose oscillation frequency varies in accordance with the output voltage V1.

Figure 14:
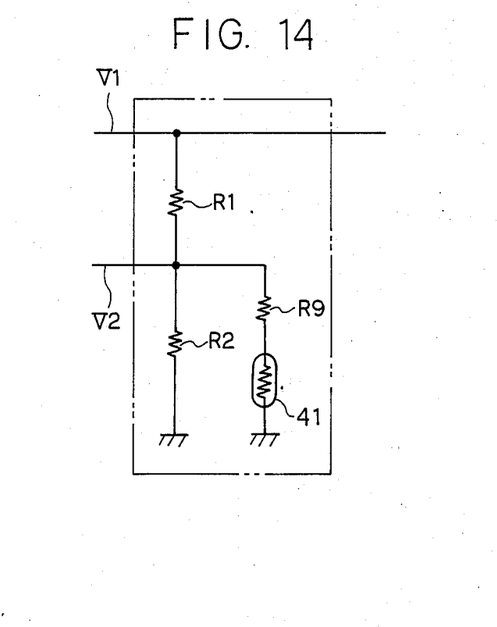

Although the aforesaid thermistor used in the voltage divider circuit 4 is of a type whose resistance value has a negative temperature coefficient, it is also possible to employ a thermistor 41 of another type whose resistance value has a positive temperature coefficient to form a circuit of the configuration shown in FIG. 14.

Furthermore, the resistor R9 used for the thermistor 41 in the foregoing examples of FIGS. 10 and 14 may be omitted depending on the temperature characteristic of the thermistor 41 with respect to its resistance value.

What is claimed is:

1. An apparatus for driving a liquid crystal element, mounted on a vehicle, comprising:
    a feedback control type voltage booster circuit, for connecting to a battery of said vehicle, for producing an output voltage that can be greater than the voltage of said battery said output voltage being a function of a control voltage applied to said voltage booster circuit;
    a thermistor having a predetermined temperature resistance characteristic for sensing the temperature of said liquid crystal element by changing its resistance value according to said predetermined temperature-resistance characteristic;
    a voltage divider circuit including said thermistor as a component thereof for dividing said output voltage from said booster circuit to produce said control voltage which is coupled to said booster circuit, said voltage divider circuit being so formed as to decrease a change of said control voltage relative to a change in the resistance value of said thermistor so that the output voltage of said booster circuit is increased more sharply as the sensed temperature becomes low, thus providing a booster circuit output voltage that is a non-linear function of temperature; and
    a driving circuit for driving said liquid crystal element with said booster circuit output voltage.

2. The apparatus according to claim 1, wherein said voltage divider circuit comprises first and second resistors connected in series with each other forming a first circuit node therebetween, the series circuit of said first and second resistors being coupled between said output voltage of said booster circuit and circuit ground, said thermistor being connected in parallel with said first resistor, whereby said control voltage is produced at said first circuit node.

3. The apparatus according to claim 1, wherein said voltage divider circuit comprises a Zener diode and a resistor connected in series therewith between said output voltage of said booster circuit and circuit ground, and said thermistor is connected in parallel with said Zener diode between said booster circuit output voltage and a second circuit node between said Zener diode and resistor, whereby said control voltage is produced at said second node.

4. The apparatus according to claim 2, further comprising a resistor for setting the lower limit of said output voltage connected in series with said thermistor.

5. The apparatus as defined in claim 1, wherein said voltage divider circuit comprises first and second resistors connected in series with each other between said output voltage of said booster circuit and circuit ground, and said thermistor is connected in parallel with said second resistor between circuit ground and a first circuit node between said first and second resistors, whereby voltage is produced at the first circuit node.

6. The apparatus as defined in claim 1, further comprising a temperature sensor for detecting the temperature of said liquid crystal element, and an oscillator circuit functioning in response to an output signal from said temperature sensor and producing an oscillation output of a frequency lowered in accordance with temperature fall in said liquid crystal element, wherein said driving circuit modulates the output voltage of said booster circuit with an AC voltage of a frequency determined by the oscillation frequency of said oscillator circuit and drives said liquid crystal element by the modulated voltage.

7. The apparatus as defined in claim 1, further comprising a voltage controlled oscillator providing an output oscillation frequency that is a function of the output voltage of said booster circuit, wherein said driving circuit modulates the output voltage of said booster circuit with an AC voltage of a frequency determined by the oscillation frequency of said voltage controlled oscillator and drives said liquid crystal element by the modulated voltage.

8. The apparatus as defined in claim 1, further comprising an oscillator circuit, a discriminator circuit for evaluating the output voltage of said booster circuit, and means for lowering the oscillation frequency of said oscillator circuit when the output voltage evaluated by said discriminator circuit is higher than a predetermined level, wherein said driving circuit modulates the output voltage of said booster circuit with an AC voltage of a frequency determined by the oscillation frequency of said oscillator circuit and drives said liquid crystal element by the modulated voltage.

9. The apparatus according to claim 3, further comprising a resistor for setting the lower limit of said output voltage connected in series with said thermistor.

10. An apparatus for driving a liquid crystal device mounted on an automobile comprising:
    a battery mounted on said automobile;
    a temperature sensing element for sensing temperature of said liquid crystal device;
    a booster circuit connected to said battery for providing an output voltage that is a function of a control voltage applied thereto, said output voltage, which voltage can be greater than said battery voltage;
    a divider circuit connected in such a manner between said booster circuit and said temperature sensing element it provides said control voltage to said booster circuit causing said booster circuit to provide its output voltage such that it changes more sharply with respect to the sensed temperature as the temperature of said liquid crystal device falls; and
    a circuit connected betweeen said booster circuit and said liquid crystal device for driving said liquid crystal device with the output voltage of said booster circuit.

11. An apparatus according to claim 10 further comprising:
    an oscillator for generating an oscillation signal having a frequency which is dependent on temperature of said liquid crystal device.

12. An apparatus according to claim 11, wherein said liquid crystal device is used in a reflection mirror of said automobile.

* * * * *